US012687250B2

(12) United States Patent
 Wagner

(10) Patent No.: US 12,687,250 B2
(45) Date of Patent: Jul. 21, 2026

(54) QUICK CONNECT FOR A SPRAY SYSTEM

(71) Applicant: Graco Minnesota Inc., Minneapolis, MN (US)

(72) Inventor: Christopher C. Wagner, Saint Anthony, MN (US)

(73) Assignee: Graco Minnesota Inc., Minneapolis, MN (US)

( * ) Notice: Subject to any disclaimer, the term of this patent is extended or adjusted under 35 U.S.C. 154(b) by 0 days.

(21) Appl. No.: 19/057,059

(22) Filed: Feb. 19, 2025

(65) Prior Publication Data

US 2025/0264177 A1     Aug. 21, 2025

Related U.S. Application Data

(60) Provisional application No. 63/555,692, filed on Feb. 20, 2024.

(51) Int. Cl.
 *F16L 37/62* (2006.01)
 *B05B 7/24* (2006.01)
(52) U.S. Cl.
 CPC ................ *F16L 37/62* (2013.01); *B05B 7/24* (2013.01)
(58) Field of Classification Search
 CPC ... F16L 27/08; F16L 27/0804; F16L 27/0808; F16L 47/18; F16L 47/04; F16L 33/18; F16L 33/20; F16L 33/207; F16L 33/2078; F16L 33/22; F16L 33/223; F16L 33/224; F16L 37/53; F16L 37/50; B05B 9/01
 USPC .......................................... 239/376–379, 525
 See application file for complete search history.

(56) References Cited

U.S. PATENT DOCUMENTS

| | | | |
|---|---|---|---|
| 1,117,762 A | 11/1914 | Barcus | |
| 3,202,363 A * | 8/1965 | Kautz | ..................... B05B 7/045 239/416.4 |
| 3,249,372 A | 5/1966 | Pollack | |
| 3,377,028 A | 4/1968 | Bruggeman | |
| 3,515,355 A * | 6/1970 | Wagner | ..................... B05B 1/14 239/526 |
| 3,831,862 A * | 8/1974 | Calder | ..................... B05B 9/01 239/526 |
| 4,478,435 A * | 10/1984 | Cheshier | ............. F16L 27/0808 285/918 |
| 5,330,108 A | 7/1994 | Grime et al. | |
| 5,538,292 A * | 7/1996 | Sommer | ............. F16L 27/0808 285/98 |

(Continued)

FOREIGN PATENT DOCUMENTS

| | | |
|---|---|---|
| WO | 2015131932 A1 | 9/2015 |
| WO | 2021087410 A1 | 5/2021 |

OTHER PUBLICATIONS

European Search Report for European patent application No. 25157336.6 dated Jun. 25, 2025, 8 pages.

(Continued)

*Primary Examiner* — Aaron M Dunwoody
(74) *Attorney, Agent, or Firm* — Kinney & Lange, P.A.

(57) ABSTRACT

A hose is connected to a spray gun or a pressurized fluid source by a quick connect coupler. The quick connect coupler can be integrated with the hose to form a hose assembly or can be integrated with a spray gun or pump. The quick connect coupler includes an internal piston that is pressure biased into sealing engagement with a fitting connected to the quick connect coupler.

20 Claims, 9 Drawing Sheets

(56)                References Cited

U.S. PATENT DOCUMENTS

| | | | | |
|---|---|---|---|---|
| 6,006,953 | A * | 12/1999 | Newson | G01F 11/04 |
| | | | | 222/334 |
| 7,341,209 | B1 * | 3/2008 | Ko | F16L 19/0237 |
| | | | | 239/525 |
| 8,245,954 | B2 * | 8/2012 | Tanaka | B05B 7/0425 |
| | | | | 239/525 |
| 9,266,137 | B2 | 2/2016 | Mather et al. | |
| 10,859,191 | B2 | 12/2020 | Langer et al. | |
| 11,668,421 | B2 | 6/2023 | Sauter et al. | |
| 2003/0172976 | A1 * | 9/2003 | Scheffel | F16L 37/32 |
| | | | | 137/614.04 |
| 2005/0178857 | A1 * | 8/2005 | Roman | B05B 12/0026 |
| | | | | 239/525 |
| 2005/0280260 | A1 * | 12/2005 | Lu | F16L 27/0804 |
| | | | | 285/354 |
| 2006/0097517 | A1 * | 5/2006 | Wu | F16L 33/223 |
| | | | | 285/305 |
| 2007/0119989 | A1 * | 5/2007 | Nagano | E03C 1/023 |
| | | | | 239/525 |
| 2008/0012312 | A1 * | 1/2008 | Hefele | F16L 37/23 |
| | | | | 285/308 |
| 2009/0045271 | A1 * | 2/2009 | Alexander | B08B 3/026 |
| | | | | 239/722 |
| 2016/0207063 | A1 * | 7/2016 | Mao | B05B 15/628 |
| 2018/0117611 | A1 | 5/2018 | Chen | |
| 2019/0299233 | A1 * | 10/2019 | Johnston | B05B 9/01 |
| 2020/0316625 | A1 | 10/2020 | Jensen | |
| 2021/0394208 | A1 | 12/2021 | Wagner et al. | |
| 2022/0042633 | A1 * | 2/2022 | Nikles | F16L 27/0808 |
| 2023/0175622 | A1 * | 6/2023 | Breeden, III | F16L 29/002 |
| | | | | 251/149.6 |

OTHER PUBLICATIONS

Operating Instructions/Main Seal Replacement, Fastest Inc., 2021. Retrieved from Internet, https://www.fastestinc.com/application/files/9116/2266/1746/WP095.pdf.

* cited by examiner

QUICK CONNECT FOR A SPRAY SYSTEM

CROSS-REFERENCE TO RELATED APPLICATION(S)

This application claims priority to U.S. Provisional Application No. 63/555,692 filed Feb. 20, 2024 and entitled "QUICK CONNECT FOR A SPRAY SYSTEM," the disclosure of which is hereby incorporated by reference in its entirety.

BACKGROUND

The present disclosure relates generally to quick connect couplers. More particularly, this disclosure relates to quick connect couplers in fluid dispensing systems, such as fluid spray systems.

Quick connect couplings are configured for quick and easy couplings. Quick connect couplings provide connections between fluid passages. Such couplings do not require a tool to form fluid tight connections. Quick connect couplings can be bulky or configured for lower pressure operations, which can render such couplings unsuitable for fluid dispense operations, such as fluid spraying systems. Push to connect couplers generally require rigid tubing and not flexible hosing. Further, such connectors are generally configured to operate at pressures below those required for fluid spraying. Plug-and-socket style quick connectors are generally large, which is unwieldy when connected to spray guns and within spray systems. Further, such connectors can suffer from side-load sensitivity. Cam-and-groove style quick connectors are generally large and heavy, which is unwieldy when connected to spray guns and within spray systems.

Fluid spray systems typically operate at high pressures that operate at too high of pressure for quick connect couplings or for which quick connect couplings are unwieldy. The couplings in fluid spray systems typically require the use of a tool, such as a wrench, to form the fluid tight fittings suitable for conveying fluid in such a system.

SUMMARY

According to an aspect of the disclosure, a hose assembly configured to convey pressurized fluid in a fluid dispensing system includes a flexible hose; and a quick connect coupler mechanically and fluidly connected to the hose. The quick connect coupler includes a coupler body having a mount end and a distal end, the mount end configured to interface with a fitting; a hose connector extending out of the coupler body through the distal end of the coupler body, the hose connector disposed at least partially within the flexible hose; a piston disposed within the coupler body, the piston having a piston body, a piston passage extending fully through the piston body along a coupler axis, a first seal groove formed on the piston body, and a second seal groove formed on the piston body; a first piston seal mounted in the first seal groove, the first piston seal engaging the coupler body and the piston; and a second piston seal mounted in the second seal groove, the second piston seal extending axially beyond the piston body and oriented towards the mount end. The piston is movable along the valve axis relative to the coupler body.

According to an additional or alternative aspect of the disclosure, a spray gun includes a gun body supporting a nozzle; a fluid flowpath at least partially disposed within the gun body, the fluid flowpath configured to convey a pressurized fluid to the nozzle; and a quick connect coupler supported by the gun body and configured to mechanically and fluidly connect a hose assembly to the spray gun. The quick connect coupler includes a coupler body having a mount end and a distal end, the mount end configured to interface with a fitting of the hose assembly; a piston disposed within the coupler body, the piston having a piston body, a piston passage extending fully through the piston body along a coupler axis, a first seal groove formed on the piston body, and a second seal groove formed on the piston body; a first piston seal mounted in the first seal groove, the first piston seal engaging the coupler body and the piston; and a second piston seal mounted in the second seal groove, the second piston seal extending axially beyond the piston body and oriented towards the mount end. The piston is movable along the valve axis relative to the coupler body.

The present summary is provided only by way of example, and not limitation. Other aspects of the present disclosure will be appreciated in view of the entirety of the present disclosure, including the entire text, claims, and accompanying figures.

Figure 1:
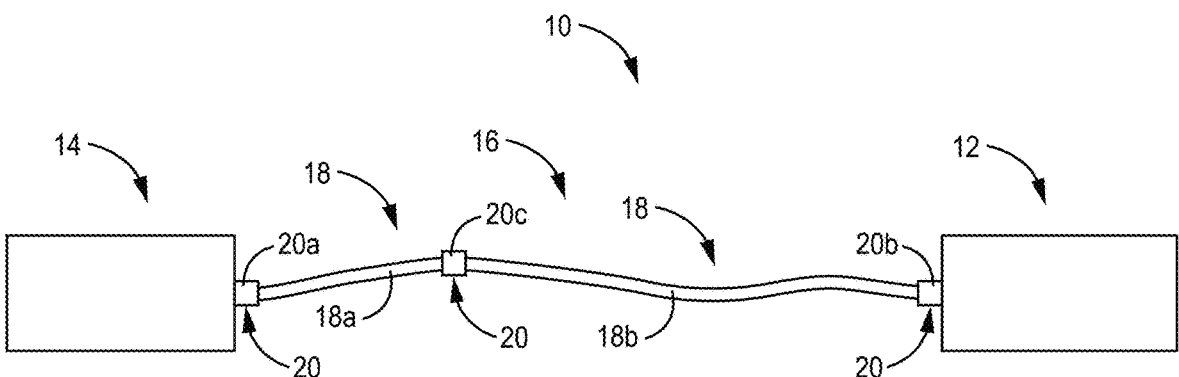
FIG. 1 is a block diagram of a fluid dispensing system.

While the above-identified figures set forth one or more embodiments of the present disclosure, other embodiments are also contemplated, as noted in the discussion. In all cases, this disclosure presents embodiments by way of representation and not limitation. It should be understood that numerous other modifications and embodiments can be devised by those skilled in the art, which fall within the scope and spirit of the principles of the disclosure. The figures may not be drawn to scale, and applications and embodiments of the present disclosure may include features and components not specifically shown in the drawings.

DETAILED DESCRIPTION

According to aspects of the present disclosure, components of a spray system can be fluidly and mechanically connected together by a quick connect coupling. The quick connect coupling is integrated into components of the spray system to form the mechanical and fluid connections.

According to aspects of the disclosure, a hose assembly is configured to convey fluid between a pressure source and a fluid dispenser. The hose assembly includes a flexible hose configured to convey pressurized, which fluid can be pressurized gas or liquid such as paint, lacquer, solvent, varnish, fine finishes, high-gloss finishes, waterborne coating, solvent-borne coating, texture material, etc. The hose assembly further includes a quick connect coupling for connecting the hose. The quick connect coupling can be configured to connect the hose to the fluid dispenser, the pressure source, another hose, among other options. The quick connect coupling is configured such that the coupling can be attached by hand without the use of other tools. The quick connect coupling is configured such that the pressure of the flowing fluid enhances the seal formed by the quick connect coupling.

According to aspects of the disclosure, a spray gun is configured to emit a spray of material for application on a substrate. The spray gun receives one or more flows of pressurized fluid (e.g., compressed gas and/or pressurized spray material) and outputs a spray of spray material. A quick connect coupling can be integrated into the spray gun to facilitate connection of a flexible hose to the spray gun, the flexible hose configured to convey the pressurized fluid to the spray gun. The quick connect coupling facilitate connection of and removal of the hose from the spray gun without the use of tools.

According to aspects of the disclosure, a pressure source, such as a pump, is configured to output pressurized fluid to a flexible hose. For example, the pressure source can emit pressurized gas or pressurized spray material for spraying by a downstream spray gun. A quick connect coupling can be integrated into an outlet fitting of the pressure source to facilitate connection of a flexible hose to the pressure source, the flexible hose configured to convey the pressurized fluid from the pressure source. The quick connect coupling facilitate connection of and removal of the hose from the pressure source without the use of tools.

Components can be considered to radially overlap when those components are disposed at common axial locations along an axis. A radial line extending from the axis will extend through each of the radially overlapping components. Components can be considered to axially overlap when those components are disposed at common radial and circumferential locations relative to an axis such that an axial line parallel to the axis extends through the axially overlapping components. Components can be considered to circumferentially overlap when aligned about the axis, such that a circle centered on the axis passes through the circumferentially overlapping components.

FIG. 1 is a block diagram of fluid dispensing system 10. Fluid dispensing system 10 includes pressure source 12, dispenser 14, and hose assembly 14. In the example shown, hose assembly 14 includes hoses 18*a*, 18*b* (collectively herein "hose 18" or "hoses 18") and quick connect couplers 20*a*, 20*b*, 20*c* (collectively herein "quick connect coupler 20" or "quick connect couplers 20").

Fluid dispensing system 10 is configured to output fluid under pressure. Pressure source 12 is configured to put the fluid under pressure and convey the fluid to dispenser 14. It is understood that, in some examples, fluid dispensing system 10 can include multiple pressure sources that deliver multiple fluids to dispenser 14. For example, a first pressure source can be configured to provide a liquid to dispenser 14 and a second pressure source 12 can provide compressed gas to dispenser 14. Pressure source 12 can be of any configuration suitable for driving pressurized fluid to dispenser 14. For example, pressure source 12 can be a pressurized container holding fluid under pressure (e.g., a pressure pot for compressed gas or liquid), a pump (e.g., a piston, plunger, diaphragm, peristaltic, gear, or other pump), an air compressor, among other options.

Dispenser 14 is configured to output pressurized fluid. For example, dispenser 14 can be configured to output a spray of spray fluid under pressure. Dispenser 14 can be configured as a spray gun, automatic or manual, that outputs fluid under pressure. In some examples, dispenser 14 can include an internal valve that controls flow of one or more pressurized fluids out of a nozzle of the dispenser 14. In some examples, dispenser 14 can be configured to receive flows of both compressed gas and liquid and can output both the pressurized gas and pressurized liquid as a spray.

Hose assembly 14 extends between and connects pressure source 12 and dispenser 14. Hose assembly 14 fluidly connects the pressure source 12 to the dispenser 14 and is configured to convey pressurized fluid from the pressure source 12 to dispenser 14 under pressure. In the example shown, hose assembly 14 includes multiples hoses 18 that are connected together to form a passage for conveying the fluid to dispenser 14. Hoses 18 are flexible hoses. It is understood, however, that hose assembly 14 can include a single hose 18 extending between pressure source 12 and dispenser 14. In examples in which dispenser 14 is configured to receive flows of multiple fluids (e.g., compressed gas and pressurized liquid) multiple hose assemblies 16 can extend between the multiple pressure sources 12 and dispenser 14. For example, a first hose assembly 14 can connect the dispenser 14 and the pressure source 12 configured to provide compressed gas and a second hose assembly 14 can connect dispenser 14 and the pressure source 12 configured to provide pressurized liquid.

Quick connect couplers 20 form connections for the hose assembly 14. In the example shown, quick connect coupler 20*a* connects hose assembly 14 to dispenser 14, quick connect coupler 20*b* connects hose assembly 14 to pressure source 12 and quick connect coupler 20*c* connects hose 18*a* and hose 18*b* together. While hose assembly 14 is shown as including multiple quick connect couplers 20, it is understood that not all examples are so limited. For example, hose assembly 14 can be configured with a single quick connect coupler 20, such as to connect hose assembly 14 to dispenser 14, to connect hose assembly 14 to pressure source 12, or to connect hoses 18 of the hose assembly 14. It is understood that hose assembly 14 can include any desired number of quick connect couplers 20 for forming mechanical and fluid connections.

Quick connect couplers 20 are configured for quick attachment and detachment of hose assembly 14. Quick connect couplers 20 can be connected by hand and removed by hand without the use of tools, such as a wrench. As discussed in more detail below, quick connect couplers 20 are configured such that the pressurized fluid flowing within hose assembly 14 enhances the fluid seal formed by the quick connect coupler 20.

Hose assembly 14 including quick connect couplers 20 provides significant advantages. Quick connect couplers 20 allow hose assembly 14 to be quickly and efficiently connected to dispenser 14 and/or pressure source 12. Quick connect couplers 20 can facilitate quick assembly of hose assembly 14 in examples in which hose assembly 14 includes multiple hoses 18. Quick connect couplers 20 can reduce downtime and provide for more efficient spray operations while also lessening the need for tools required to form other types of couplings.

Figure 2:
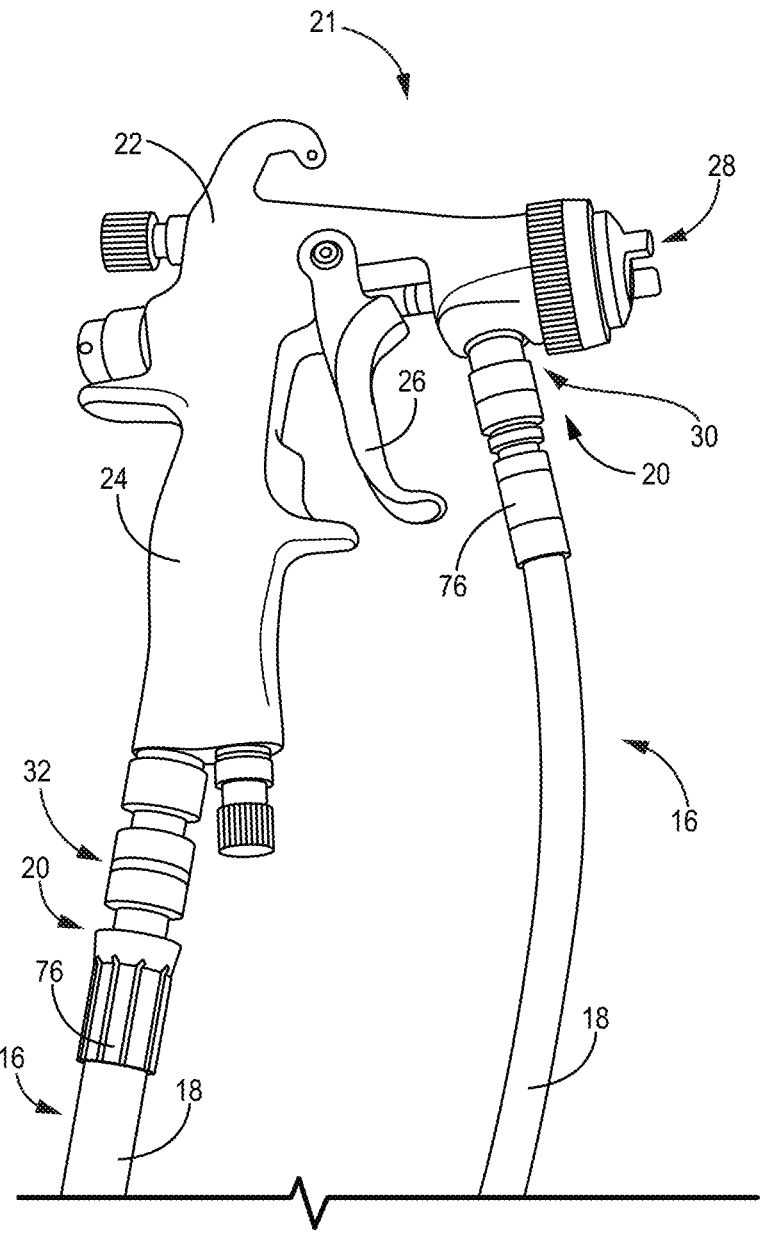
FIG. 2 is an isometric view of a spray gun.

FIG. 2 is an isometric view of spray gun 21. FIG. 2. Spray gun 21 includes gun body 22, handle 24, trigger 26, nozzle 28, material intake 30, and gas intake 32. Hose 18, quick connect coupler 20, and crimp 76 of hose assembly 14 are shown.

Spray gun 21 is configured to intake flows of pressurized fluid and to output the pressurized fluid as a fluid spray. Gun body 22 can contain one or more valves for controlling flow of the pressurized flow to nozzle 28. The spray gun 21 is configured to output the fluid spray through nozzle 28. Handle 24 is a projecting portion of gun body 22. Handle 24 is configured to be grasped by a single hand of a user such that the user can aim and cause spraying by spray gun 21 with the single hand. Handle 24 can be formed monolithically with other portions of gun body 22 or can be formed separately from other portions of gun body 22. Handle 24 can, in some examples, be removably connected to other portions of gun body 22. Trigger 26 is connected to gun body 22 and is configured to control spraying by spray gun 21. Actuation of trigger 26 can open valving within spray gun 21 to cause emission of the spray fluid by spray gun 21. Release of trigger 26 can cause the valving to close to stop spraying by spray gun 21.

Material intake 30 is configured to connect to a material supply hose to provide spray material (e.g., a spray liquid such as paint) to spray gun 21 under pressure. Material intake 30 can be configured as a threaded fitting, among other options. Material intake 30 can be configured as a male fitting or a female fitting. Gas intake 32 is configured to connect to a gas supply hose to provide compressed gas to spray gun 21 under pressure. Gas intake 32 can be configured as a threaded fitting, among other options. Gas intake 32 can be configured as a male fitting or a female fitting. In the example shown, gas intake 32 is configured as a male connector and quick connect coupler 20 is configured as a female coupler for connecting to the male gas intake 32. As discussed in more detail below, however, quick connect coupler 20 can be configured as a male coupler configured to connect to a female fitting. In various other examples, quick connect coupler 20 can be integrated into spray gun 21 or into a pressure source 12 such as a pump.

Quick connect coupler 20 is configured to quickly and easily connect a flexible hose 18 to spray gun 21. In the example shown, a first hose assembly 14 is connected to spray gun 21 at material intake 30 to provide spray material to spray gun 21 under pressure and a second hose assembly 14 is connected to spray gun 21 at gas intake 32 to provide compressed gas to spray gun 21.

Figure 3A:
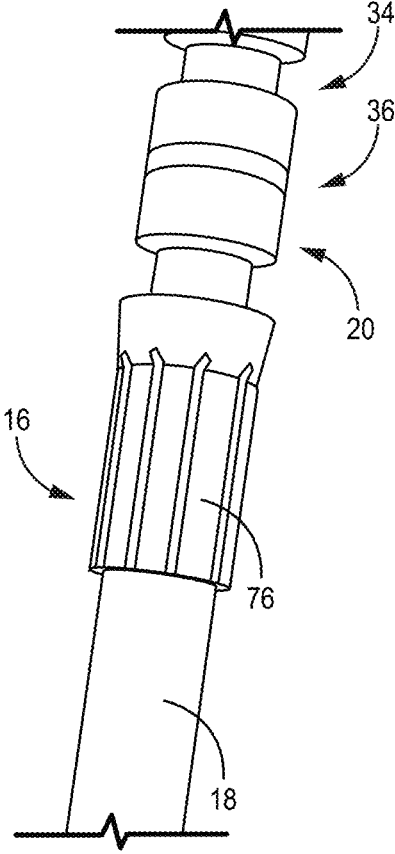
FIG. 3A is an enlarged view of a hose assembly including quick connect coupler.
Figure 3B:
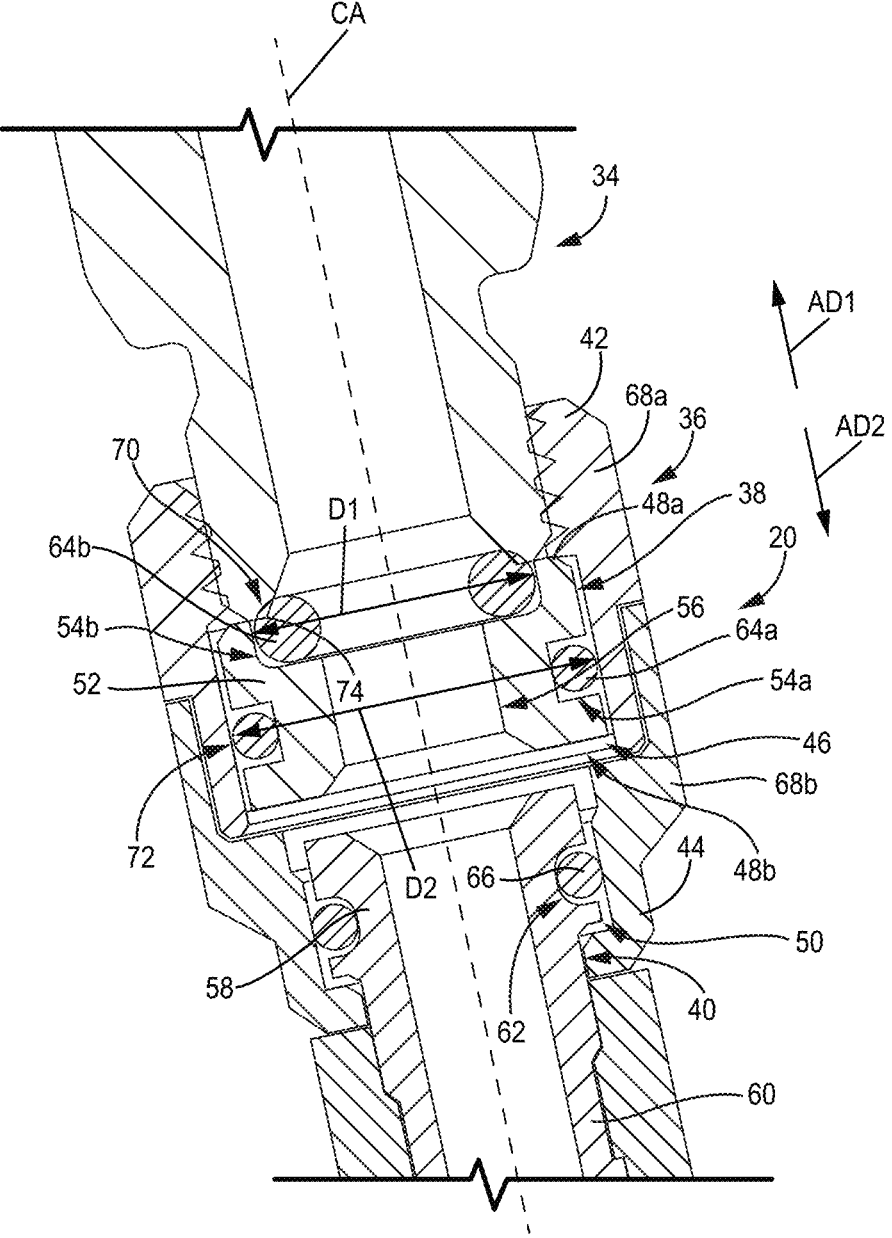
FIG. 3B is a cross-sectional view of the hose assembly and quick connect coupler shown in FIG. 3A.

FIG. 3A is an enlarged elevational view of quick connect coupler 20 connected to spray gun 21. FIG. 3B is an enlarged cross-sectional view of quick connect coupler 20 coupled to a fitting 34 (e.g., material intake 30 or gas intake 32). Quick connect coupler 20 includes coupler body 36, piston 38, and hose connector 40. Coupler body 36 includes fitting end 42, system end 44, piston chamber 46, piston shoulder 48a, piston shoulder 48b, and connector shoulder 50. Piston 38 includes piston body 52, seal groove 54a, seal groove 54b, and piston passage 56. Hose connector 40 includes connector body 58, barb 60, and body groove 62. Piston seal 64a, piston seal 64b, and connector seal 66 are also shown. Quick connect coupler 20 is configured to mechanically and fluidly connect hose assembly 14 to fitting 34.

Coupler body 36 houses other components of quick-connect coupler 20. Coupler body 36 defines piston chamber 46 within an interior of coupler body 36. A passage extends fully through coupler body 36 such that coupler body 36 is open in a first axial direction AD1 along coupler axis CA and in a second axial direction AD2 along coupler axis CA. In the example shown, coupler body 36 includes body portion 68a and body portion 68b. Body portion 68a and body portion 68b are connected together to form coupler body 36. For example, body portion 68a and body portion 68b can be connected together by interfaced threading, among other options. While coupler body 36 is shown as formed by body portion 68a and body portion 68b, it is understood that not all examples are so limited. For example, coupler body 36 can be monolithic or formed from more than two component parts.

Fitting end 42 of coupler body 36 is configured to interface with fitting 34 to connect quick connect coupler 20 to fitting 34. For example, fitting end 42 can include threads configured to interface with corresponding threads on fitting 34 to form a threaded interface therebetween. In the example shown, fitting end 42 includes interior threading configured to interface with exterior threading on fitting 34. In the example shown, the threading is formed on body portion 68a of coupler body 36. System end 44 is disposed at an opposite axial end of coupler body 36 from fitting end 42. System end 44 is configured to be oriented towards the hose 18 of the hose assembly 14 including quick connect coupler 20. System end 44 is configured to be oriented towards the system that quick connect coupler 20 is integrated into. In the example shown, system end 44 is oriented towards hose 18. System end 44 can be oriented towards spray gun 21 in examples in which quick connect coupler 20 is integrated into spray gun 21. System end 44 can be oriented towards the pressure source 12, such as towards a pump, in examples in which quick connect coupler 20 is integrated into the pressure source 12.

Hose connector 40 is partially disposed in coupler body 36 and extends out of coupler body 36. Hose connector 40 is configured to connect to a hose 18. In the example shown, hose connector 40 includes connector body 58 that is disposed within coupler body 36. Barb 60 extends from connector body 58 and out of coupler body 36. Barb 60 is configured to extend into a hose 18 to connect to the hose 18. Connector shoulder 50 extends to axially overlap with connector body 58 to retain connector body 58 within coupler body 36. Crimp 76 secures the hose 18 to the barb 60.

Body groove 62 is formed on hose connector 40. Connector seal 66 is disposed in body groove 62 and is configured to form a fluid tight seal between the exterior of hose connector 40 and the interior of coupler body 36. Connector seal 66 can be of any desired configuration, such as an o-ring seal, among other options.

In the example shown, hose connector 40 is freely rotatable on coupler axis CA. Hose connector 40 is not rotationally limited such that hose connector 40 can freely swivel on coupler axis CA. Connector seal 66 maintains sealing engagement with coupler body 36 as hose connector 40 swivels on coupler axis CA. Hose connector 40 being freely rotatable on coupler axis CA allows for hose 18 to swivel relative to the spray gun 21 or pressure source 12 during operation. Such a configuration can provide for more ergonomic and efficient spray operations. Piston 38 is disposed within coupler body 36. Piston 38 is configured to be biased into engagement with the fitting that quick connect coupler 20 is mounted to seal the connection between quick connect coupler 20 and the fitting. Piston 38 is movable relative to coupler body 36 along coupler axis CA. Piston passage 56 extends fully axially through piston 38 such that a flowpath is formed through piston 38. The pressurized fluid flows through piston 38 as the fluid flows through the quick connect coupler 20.

Piston 38 supports piston seal 64a and piston seal 64b. Seal groove 54a is formed on a radial exterior of piston 38. Seal groove 54a extends fully annularly about piston 38. Piston seal 64a is disposed within seal groove 54a. Piston seal 64a seals between the exterior of piston 38 and the interior of coupler body 36. Seal groove 54a retains piston seal 64a in both axial directions AD1, AD2. Seal groove 54b is formed on an end of piston 38. Seal groove 54b extends radially outward from piston passage 56. Piston seal 64b is disposed in seal groove 54b. In the example shown, piston seal 64b extends out of seal groove 54b and axially beyond piston body 52. Piston seal 64b projects beyond piston 38 such that piston seal 64b can interface with and seal against seal face 74 of the fitting 34. Piston seal 64b projects beyond piston 38 such that a portion of piston seal 64b radially overlaps with piston 38 and a portion of piston seal 64b does not radially overlap with piston 38.

Piston seal 64a has a larger diameter than piston seal 64b. The seal interface between piston 38 and fitting 34, which can be referred to as a fitting sealing interface 70, has diameter D1 while the seal interface between piston 38 and coupler body 36, which can be referred to as a piston sealing interface 72, has diameter D2. Diameter D2 is larger than diameter D1. The pressure acting on piston 38 at the piston sealing interface 72 biases piston 38 in axial direction AD1 while the pressure acting on piston 38 at the fitting sealing interface 70 biases piston 38 in axial direction AD2. The larger diameter D2 at the piston sealing interface 72 means that a greater force is acting on piston 38 axially relative to the coupler axis CA at the piston sealing interface 72 than at the fitting sealing interface 70. As such, the fluid pressure biases piston 38 in the first axial direction AD1. Piston 38 is biased such that piston seal 64b is pushed against seal face 74 of fitting 34 to maintain a sealing interface with fitting 34.

Piston shoulder 48a is disposed at a first end of piston chamber 46 and piston shoulder 48b is disposed at a second end of piston chamber 46. Piston shoulders 48a, 48b retain piston 38 within piston chamber 46. Piston shoulder 48a extends to axially overlap with piston body 52 of piston 38. Piston shoulder 48b extends to axially overlap with piston body 52 of piston 38. Piston shoulders 48a, 48b axially overlapping with piston body 52 limit displacement of piston 38 along coupler axis CA. In some examples, piston shoulder 48a can be formed by the threading of coupler body 36 that interfaces with the threading of fitting 34. As such, the threading of coupler body 36 can facilitate mechanical connection to fitting 34 while also limiting displacement of piston 38 in first axial direction AD1. Piston seal 64b is configured such that piston seal 64b can project axially in first axial direction AD1 beyond piston shoulder 48a. Piston seal 64b extending axially beyond piston shoulder 48a can facilitate engagement between piston seal 64b and fitting 34.

During operation, quick connect coupler 20 facilitates quick and easy connection of hose assembly 14. Quick connect coupler 20 connect to fitting 34, which can be a fitting of a spray gun 21 (e.g., material intake 30 or gas intake 32) or to a fitting of a pressure source. Coupler body 36 is connected to fitting 34 and fitting 34 extends into coupler body 36. Quick connect coupler 20 is threaded onto fitting 34 until quick connect coupler 20 is finger tight. Threading quick connect coupler 20 onto fitting 34 causes seal face 74 of fitting 34 to engage with piston seal 64b. In some examples, quick connect coupler 20 is configured such that fitting 34 biases piston 38 into piston shoulder 48b such that piston seal 64b and piston 38 resist further threading of coupler body 36 onto fitting 34, thereby making quick connect coupler 20 finger tight on fitting 34.

Two modes of operation are discussed in more detail, the mode depending on whether fitting 34 is receiving pressurized fluid (e.g., at a spray gun 21) or outputting pressurized fluid (e.g., from pressure source 12). It is understood that fitting 34 can be connected to a hose 18 similar to quick connect coupler 20 such as when quick connect coupler 20 is couples multiple flexible hoses together to form a hose assembly 14. In such an example, the fitting 34 can be configured as a fluid output or a fluid receiver.

In examples in which fitting 34 is a fluid receiver, such as on a spray gun, the fluid flows in axial direction AD1 such that axial direction AD1 is the downstream direction and axial direction AD2 is the upstream direction. The pressurized fluid enters into quick connect coupler 20 through hose connector 40. The pressurized fluid flows through hose connector 40, through piston passage 56, and into fitting 34. The fluid pressure acts on piston 38 to bias piston 38 into sealing engagement with fitting 34. As the fluid pressure increases, the pressure forces acting on piston 38 increase, thereby further biasing piston 38 into fitting 34 to further enhance the seal therebetween.

In examples in which fitting 34 is a fluid output, the fluid flows in axial direction AD2 such that axial direction AD2 is the downstream direction and axial direction AD1 is the upstream direction. The pressurized fluid enters into quick connect coupler 20 through fitting end 42. The pressurized fluid flows through piston passage 56, through hose connector 40, and is output to hose 18. The fluid pressure acts on piston 38 to bias piston 38 into sealing engagement with fitting 34. As the fluid pressure increases, the pressure forces acting on piston 38 increase, thereby further biasing piston 38 into fitting 34 to further enhance the seal therebetween.

As discussed above, the fitting sealing interface 70 between piston 38 and fitting 34 has diameter D1 while the piston sealing interface 72 between piston 38 and coupler body 36 has diameter D2. Diameter D2 is larger than diameter D1. The larger diameter D2 at the piston sealing interface 72 means that a greater force is acting on piston 38 at the piston sealing interface 72 than at the fitting sealing interface 70 to bias piston seal 64b into seal face 74 of fitting 34.

In examples in which quick connect coupler 20 outputs pressurized fluid to the fitting 34, such that axial direction AD1 is the downstream direction, the pressure acting on piston 38 at the piston sealing interface 72 biases piston 38 In axial direction AD1 while the pressure acting on piston 38 at the fitting sealing interface 70 biases piston 38 in axial direction AD2. The fluid pressure biases piston 38 in the downstream first axial direction AD1 due to the different diameters at the fitting sealing interface 70 and the piston sealing interface 72. In examples in which quick connect coupler 20 receives pressurized fluid from the fitting 34, such that axial direction AD1 is the upstream direction, the pressure acting on piston 38 at the piston scaling interface 72 biases piston 38 in axial direction AD1 while the pressure acting on piston 38 at the fitting sealing interface 70 biases piston 38 in axial direction AD2. The fluid pressure biases piston 38 in the first axial direction AD1. The fluid pressure biases piston 38 in the upstream first axial direction AD1 due to the different diameters at the fitting sealing interface 70 and the piston sealing interface 72. As such, quick connect coupler 20 provides mechanical and fluid connections between hose 18 and fitting 34 regardless of whether fitting 34 is configured as a fluid receiver or a fluid output.

Quick connect coupler 20 and hose 18 are assembled together as hose assembly 14. Hose assembly 14 provides significant advantages. Quick connect coupler 20 facilitates faster coupling and decoupling of flexible hoses 18 with less effort. Such a configuration lowers the burden to assemble and disassemble hose assembly 14 from a fitting 34 and also increases the likelihood that a user will properly service, clean, and use hose assembly 14. Quick connect coupler 20 does not require tools to couple and decouple from fitting 34. Such a configuration facilitates quicker and easier assembly and disassembly as the user is not required to find and use a tool. Quick connect coupler 20 provides a smaller footprint as compared to other types of quick connectors, which is particularly advantageous when coupled to a spray gun 21 which is held and manipulated by a user. Bulkier quick connectors provide less room for the user to hold the spray gun 21 while heavier quick connectors can fatigue the user. As such, quick connect coupler 20 provides for more ergonomic operation with hose assembly 16.

Figure 4:
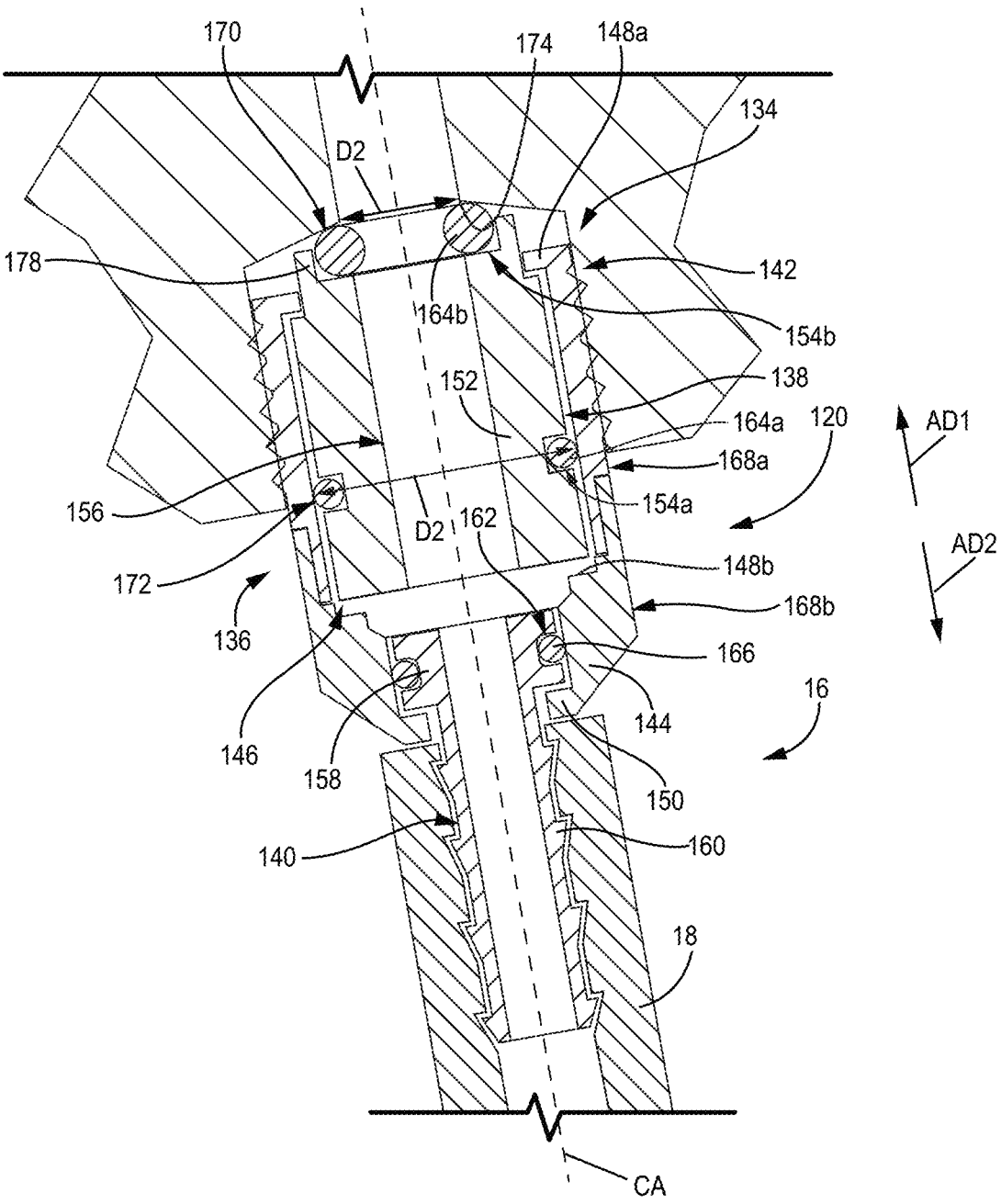
FIG. 4 is a cross-sectional view of a hose assembly including quick connect coupler.

FIG. 4 is a cross-sectional view of quick connect coupler 120. Quick connect coupler 120 is substantively similar to quick connect coupler 20 (best seen in FIGS. 3A and 3B) except that quick connect coupler 120 is configured as a male connector configured to interface with a female fitting 134. Components of quick connect coupler 120 similar to components of quick connect coupler 20 are indicated with the same reference number except increased by "100." Quick connect coupler 120 includes coupler body 136, piston 138, and hose connector 140. Coupler body 136 includes fitting end 142, system end 144, piston chamber 146, piston shoulder 148a, piston shoulder 148b, and connector shoulder 150. Piston 138 includes piston body 152, seal groove 154a, seal groove 154b, and piston passage 156. Hose connector 140 includes connector body 158, barb 160, and body groove 162. Piston seal 164a, piston seal 164b, and connector seal 166 are also shown.

Quick connect coupler 120 is configured to mate to fitting 134 to provide a mechanical and fluid connection between hose 18 and fitting 134. Coupler body 136 houses other components of quick connect coupler 120. Coupler body 136 defines piston chamber 146 within an interior of coupler body 136. A passage extends fully through coupler body 136 such that coupler body 136 is open in a first axial direction AD1 along coupler axis CA and in a second axial direction AD2 along coupler axis CA. In the example shown, coupler body 136 includes body portions 168a, 168b. Body portion 168a and body portion 168b are connected together to form coupler body 136. For example, body portion 68a and body portion 68b can be connected together by interfaced threading, among other options. While coupler body 136 is shown as formed by body portion 68a and body portion 68b, it is understood that not all examples are so limited. For example, coupler body 136 can be monolithic or formed from more than two component parts.

Fitting end 142 of coupler body 136 is configured to interface with fitting 134 to mechanically connect quick connect coupler 120 and fitting 134. For example, fitting end 142 can include threads configured to interface with corresponding threads on fitting 134 to form a threaded interface therebetween. In the example shown, fitting end 142 includes exterior threading configured to interface with interior threading on fitting 134. In the example shown, the threading is formed on body portion 68a of coupler body 136. System end 144 is disposed at an opposite axial end of coupler body 136 from fitting end 142. System end 144 is configured to be oriented towards the hose 18 of the hose assembly 16 including quick connect coupler 120.

Hose connector 140 is partially disposed in coupler body 136 and extends out of coupler body 136. Hose connector 140 is configured to connect to a hose 18. In the example shown, hose connector 140 includes connector body 158 that is disposed within coupler body 136. Barb 160 extends from connector body 158 and out of coupler body 136. Barb 160 is configured to extend into a hose 18 to connect to the hose 18. Connector shoulder 150 extends to axially overlap with connector body 158 to retain connector body 158 within coupler body 136. As shown in FIGS. 2 and 3A, a crimp 76 can secure the hose 18 to the hose connector 140.

Body groove 162 is formed on hose connector 140. Connector seal 166 is disposed in body groove 162 and is configured to form a fluid tight seal between the exterior of hose connector 140 and the interior of coupler body 136. Connector seal 166 can be of any desired configuration, such as an o-ring seal, among other options.

In the example shown, hose connector 140 is freely rotatable on coupler axis CA. Hose connector 140 is not rotationally limited such that hose connector 140 can freely swivel on coupler axis CA. Connector seal 166 maintains sealing engagement with coupler body 136 as hose connector 140 swivels on coupler axis CA.

Piston 138 is disposed within coupler body 136. Piston 138 is configured to be biased into engagement with the fitting 134 to seal the connection between quick connect coupler 120 and fitting 134. Piston passage 156 extends fully axially through piston 138 such that a flowpath is formed through piston 138. The fluid flows through piston 138 as the fluid flows through the quick connect coupler 120.

Piston 138 supports piston seal 164a and piston seal 164b. Seal groove 154a is formed on a radial exterior of piston 138. Seal groove 154a extends fully annularly about piston 138. Piston seal 164a is disposed within seal groove 154a. Piston seal 164a seals between the exterior of piston 138 and the interior of coupler body 136. The sealing interface between piston seal 164a and coupler body 136 forms piston sealing interface 172. Seal groove 154a retains piston seal 164a in both axial directions AD1, AD2. Seal groove 154b is formed on an end of piston 138. Seal groove 154b extends radially outward from piston 138. Piston seal 164b is disposed in seal groove 154b. In the example shown, piston seal 164b extends out of seal groove 154b and axially beyond piston 138. Piston seal 164b projects beyond piston 138 such that piston seal 164b can interface with and seal against seal face 174 of the fitting 134. The sealing interface between piston seal 164b and fitting 134 forms fitting sealing interface 170.

The fitting sealing interface 170 has diameter D1 while the piston sealing interface 172 has diameter D2. Diameter D2 is larger than diameter D1. The pressure acting on piston 138 at the piston sealing interface 172 biases piston 138 in axial direction AD1 while the pressure acting on piston 138 at the fitting sealing interface 170 biases piston 138 in axial direction AD2. The larger diameter D2 at the piston sealing interface 172 means that a greater force is acting on piston 138 at the piston sealing interface 172 than at the fitting sealing interface 170. The fluid pressure biases piston 138 in the first axial direction AD1.

Piston shoulder 148a is disposed at a first end of piston chamber 146 and piston shoulder 148b is disposed at a second end of piston chamber 146. Piston shoulders 148a, 148b retain piston 138 within piston chamber 146. Piston shoulder 148a extends to axially overlap with piston body 152 of piston 138. Piston shoulder 148b extends to axially overlap with piston body 152 of piston 138. Piston shoulders 148a, 148b axially overlapping with piston body 152 limit displacement of piston 138 along coupler axis CA.

In the example shown, piston 138 is configured such that piston seal 164b extends axially out of coupler body 136 to interface with seal face 174 of fitting 134. Piston body 152 includes extension 178 that is configured to position piston seal 164b axially beyond fitting end 142 to interface with seal face 174. Extension 178 can, in some examples, extend out of coupler body 136 beyond fitting end 142.

During operation, quick connect coupler 120 facilitates quick and easy connection of hose assembly 16. Quick connect coupler 120 can connect to a fitting 134 of a spray gun (e.g., material intake 30 or gas intake 32) or to a fitting 134 of a pressure source. Quick connect coupler 120 is threaded into fitting 134 until quick connect coupler 120 is finger tight. Threading quick connect coupler 120 onto fitting 134 causes seal face 174 of fitting 134 to engage with piston seal 164*b*. In some examples, quick connect coupler 120 is configured such that fitting 134 biases piston 138 into piston shoulder 148*b* such that piston seal 164*b* and piston 138 resist further threading of coupler body 136 into fitting 134, thereby making quick connect coupler 120 finger tight on fitting 134. Piston body 152 is configured such that piston seal 164*b* projects to sealingly engage with seal face 174 with piston body 152 engaging shoulder 148*b*.

Two modes of operation are discussed in more detail, the mode depending on whether fitting 134 is receiving pressurized fluid (e.g., at a spray gun 21) or outputting pressurized fluid (e.g., from pressure source 12). It is understood that fitting 134 can be connected to a hose 18 such as when quick connect coupler 120 is couples multiple flexible hoses together to form a hose assembly 16. In such an example, the fitting 134 can be configured as a fluid output or a fluid receiver.

In examples in which fitting 134 is a fluid receiver, such as on a spray gun, the fluid flows in axial direction AD1 such that axial direction AD1 is the downstream direction and axial direction AD2 is the upstream direction. The pressurized fluid enters into quick connect coupler 120 through hose connector 140. The pressurized fluid flows through hose connector 140, through piston passage 156, and into fitting 134. The fluid pressure acts on piston 138 to bias piston 138 into sealing engagement with fitting 134. As the fluid pressure increases, the pressure biases the piston 138 into the fitting 134 to further enhance the seal therebetween.

In examples in which fitting 134 is a fluid output, the fluid flows in axial direction AD2 such that axial direction AD2 is the downstream direction and axial direction AD1 is the upstream direction. The pressurized fluid enters into quick connect coupler 120 through fitting end 142. The pressurized fluid flows through piston passage 156, through hose connector 140, and is output to the hose 18. The fluid pressure acts on piston 138 to bias piston 138 into sealing engagement with fitting 134. As the fluid pressure increases, the pressure biases the piston 138 into the fitting 134 to further enhance the seal therebetween.

As discussed above, the fitting sealing interface 170 between piston 138 and fitting 134 has diameter D1 while the piston sealing interface 172 between piston 138 and coupler body 136 has diameter D2. Diameter D2 is larger than diameter D1. The larger diameter D2 at the piston sealing interface 172 means that a greater force is acting on piston 138 at the piston scaling interface 172 than at the fitting sealing interface 170 to bias piston seal 164*b* into seal face 174 of fitting 134. Quick connect coupler 120 provides mechanical and fluid connections between hose 18 and fitting 134 regardless of whether fitting 134 is configured as a fluid receiver or a fluid output.

Quick connect coupler 120 and hose 18 are assembled together as hose assembly 16. Hose assembly 16 provides significant advantages. Quick connect coupler 120 facilitates faster coupling and decoupling of flexible hoses 18 with less effort. Such a configuration lowers the burden to assemble and disassemble hose assembly 16 from a fitting 134 and also increases the likelihood that a user will properly service, clean, and use hose assembly 16. Quick connect coupler 120 does not require tools to couple and decouple from fitting 134. Such a configuration facilitates quicker and easier assembly and disassembly as the user is not required to find and use a tool. Quick connect coupler 120 provides a smaller footprint as compared to other types of quick connectors, which is particularly advantageous when coupled to a spray gun 21 which is held and manipulated by a user. Bulkier quick connectors provide less room for the user to hold the spray gun 21 while heavier quick connectors can fatigue the user. As such, quick connect coupler 120 provides for more ergonomic operation with hose assembly 16.

Figure 5:
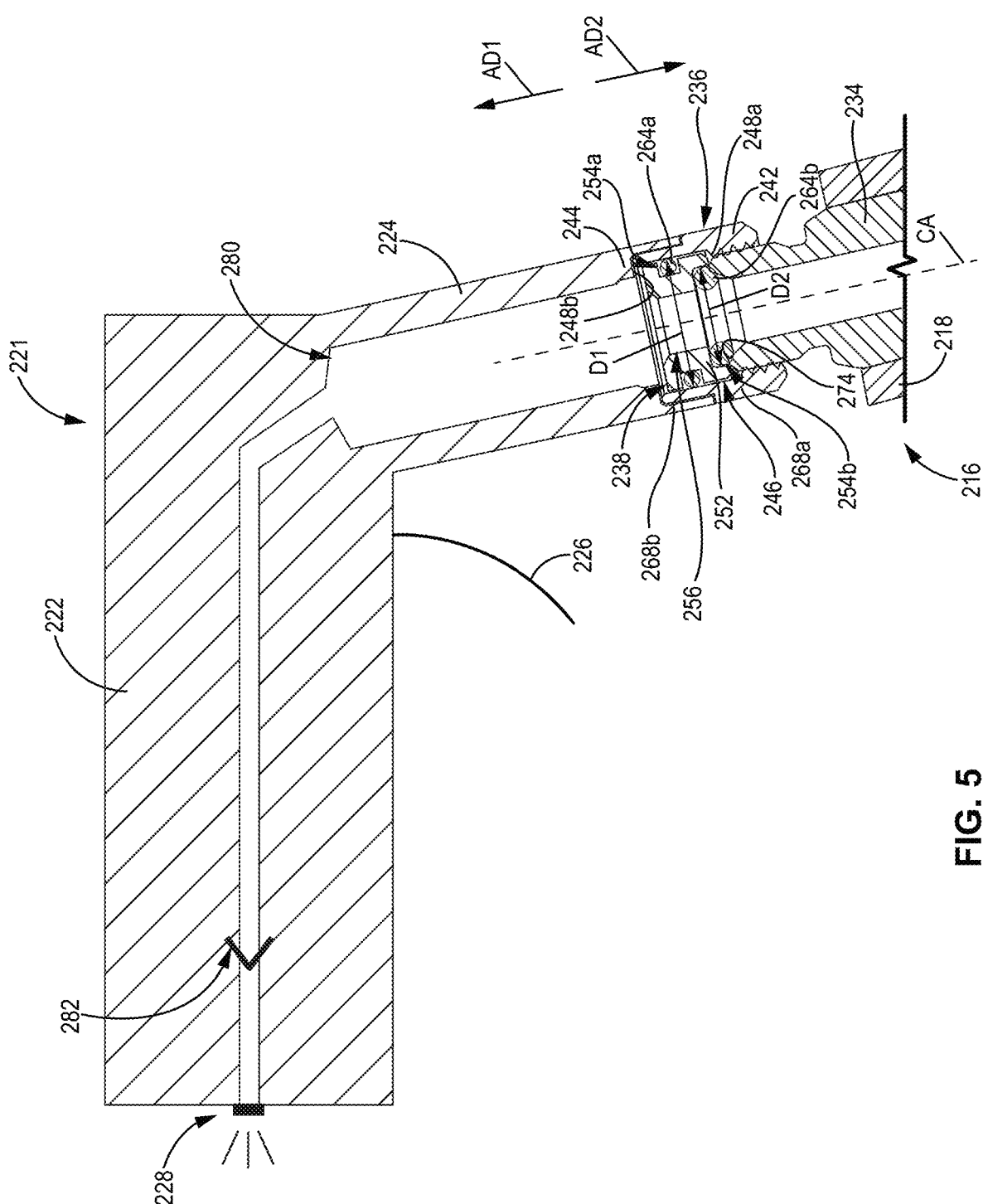
FIG. 5 is a simplified cross-sectional view of a spray gun including a quick connect coupler.

FIG. 5 is a cross-sectional view of a spray gun 221 including an integrated quick connect coupler 220. Gun body 222, handle 224, trigger 226, quick connect coupler 220, fluid pathway 280, and valve 282 of spray gun 221 are shown. Quick connect coupler 220 is substantially similar to quick connect coupler 20 (best seen in FIGS. 3A and 3B). Components of quick connect coupler 220 similar to components of quick connect coupler 20 are indicated with the same reference number except increased by "200." Components of spray gun 221 similar to components of spray gun 21 are indicated with the same reference number except increased by "200." Quick connect coupler 220 includes coupler body 236 and piston 238. Coupler body 236 includes fitting end 242, system end 244, piston chamber 246, piston shoulder 248*a*, piston shoulder 248*b*, and connector shoulder 250. Piston 238 includes piston body 252, seal groove 254*a*, seal groove 254*b*, and piston passage 256. Piston seal 264*a* and piston seal 264*b* are also shown.

Spray gun 221 is configured to emit a spray of a spray fluid onto a substrate. Spray gun 221 is fluidly connected to a hose assembly 216 to receive fluid from the hose assembly 216. As discussed above, the fluid can be a liquid configured to be emitted as the spray fluid for application on the substrate or can be a compressed gas, such as compressed gas meant to assist in atomization and/or expulsion of the spray fluid from the spray gun 221. While spray gun 221 is shown as connected to a single hose assembly 216, it is understood that spray gun 221 can be connected to multiple hose assemblies 216 to receive pressurized fluids from the multiple hose assemblies 216. For example, spray gun 221 can be connected to a first hose assembly 216 to receive pressurized gas and spray gun 221 can be connected to a second hose assembly 216 to receive pressurized spray material, similar to spray gun 21.

Handle 224 is an extension of gun body 222. Handle 224 can be grasped by a single hand of a user to aim spray gun 221 and during actuation of spraying by spray gun 221. While handle 224 is shown as formed monolithically with gun body 222, it is understood that not all examples are so limited. Trigger 226 is supported by gun body 222 and is configured to actuate valve 282 open to allow emission of spray fluid. Valve 282 is supported by gun body 222 and is configured to be actuated to an open state by trigger 226. With valve 282 in the open state, the pressurized fluid can flow downstream to nozzle 228 for emission of the spray fluid. Nozzle 228 can be shaped to shape a pattern of the emitted spray, such as into a fan or cone among other options. Valve 282 shifting to a closed state shuts off flow of the spray fluid to the nozzle 228. The valve 282 can be shifted to and held in a closed state by a spring, among other options.

Hose assembly 216 connects to spray gun 221 and is at least partially mechanically supported by spray gun 221. Fitting 234 is connected to flexible hose 218 to form hose assembly 216. Hose assembly 216 is fluidly connected to spray gun 221 to provide the pressurized fluid to spray gun

221. Quick connect coupler 220 mechanically and fluidly connects hose assembly 216 to spray gun 221.

Quick connect coupler 220 is part of spray gun 221 in the example shown. Quick connect coupler 220 is integrated into spray gun 221 such that quick connect coupler 220 remains with spray gun 221 with hose assembly 216 disconnected from spray gun 221. While quick connect coupler 220 is shown as disposed at least partially within handle 224, it is understood that quick connect coupler 220 can be integrated with spray gun 221 at any desired location at which spray gun 221 is configured to receive fluid under pressure. For example, quick connect coupler 220 can be integrated into handle 224 to receive compressed gas or compressed spray liquid, quick connect coupler 220 can be integrated into gun body 222, such as at a material intake similar to material intake 30, quick connect coupler 220 can be integrated into a valve housing removable mounted to the gun body 222 and that includes the valve 282, among other options.

In the example shown, quick connect coupler 220 is formed as a threaded receiver configured to receive the threaded fitting 234 of hose assembly 216. Coupler body 236 houses other components of quick connect coupler 220. Coupler body 236 defines piston chamber 246 within an interior of coupler body 236. The piston chamber 246 can be at least partially defined by handle 224 or by a flow directing component (e.g., tube among other options) disposed within handle 224. Coupler body 236 is at least partially disposed within handle 224. Body portion 268a can be connected to other portions of handle 224, such as by interfaced threading among other options. In some examples, coupler body 236 can be formed by material forming handle 224. In some examples, body portion 268b can be formed by tubing in the handle 224 or a flowpath formed by the handle 224.

Fitting end 242 of coupler body 236 is configured to interface with fitting 234 to connect fitting 234 to quick connect coupler 220. For example, fitting end 242 can include threads configured to interface with corresponding threads on fitting 234 to form a threaded interface therebetween. In the example shown, fitting end 242 includes interior threading configured to interface with exterior threading on fitting 234. In the example shown, quick connect coupler 220 is configured as a female receiver and fitting 234 is configured as a male connector.

Piston 238 is disposed within coupler body 236. Piston 238 is at least partially disposed within handle 224. Piston 238 can be fully disposed within handle 224 in some examples. Piston 238 is configured to be biased into engagement with the fitting 234 mounted to quick connect coupler 220 to seal the connection between quick connect coupler 220 and the fitting 234. Piston passage 256 extends fully axially through piston 238 such that a flowpath is formed through piston 238. The fluid flows through piston 238 as the fluid flows through the quick connect coupler 220.

Piston 238 supports piston seal 264a and piston seal 264b. Seal groove 254a is formed on a radial exterior of piston 238. Seal groove 254a extends fully annularly about piston 238. Piston seal 264a is disposed within seal groove 254a. Piston seal 264a seals between the exterior of piston 238 and the interior of coupler body 236. Seal groove 254a retains piston seal 264a in both axial directions AD1, AD2. Seal groove 254b is formed on an end of piston 238. Seal groove 254b extends radially outward from piston 238. Piston seal 264b is disposed in seal groove 254b. In the example shown, piston seal 264b extends out of seal groove 254b and axially beyond piston 238. Piston seal 264b projects beyond piston

238 such that piston seal 264b can interface with and seal against seal face 274 of the fitting 234.

Piston shoulder 248a is disposed at a first end of piston chamber 246 and piston shoulder 248b is disposed at a second end of piston chamber 246. Piston shoulders 248a, 248b retain piston 238 within piston chamber 246. Piston shoulder 248a extends to axially overlap with piston body 252 of piston 238. Piston shoulder 248b extends to radially overlap with piston body 252 of piston 238. Piston shoulders 248a, 248b radially overlapping with piston body 252 limit displacement of piston 238 along coupler axis CA.

During operation, quick connect coupler 220 facilitates quick and easy connection of hose assembly 216. Quick connect coupler 220 can connect to fitting 234 of hose assembly 216 to receive pressurized fluid into spray gun 221. Fitting 234 is threaded onto quick connect coupler 220 at a finger tight interface. Threading fitting 234 into quick connect coupler 220 causes seal face 274 of fitting 234 to engage with piston seal 264b. Piston 238 is movable within piston chamber 246 along coupler axis CA. In some examples, quick connect coupler 220 is configured such that fitting 234 can push piston 238 into piston shoulder 248b such that piston seal 264b and piston 238 resist further threading of fitting 234 into quick connect coupler 220, thereby making fitting 234 finger tight on quick connect coupler 220.

The fitting sealing interface 270 has diameter D1 while the piston sealing interface 272 has diameter D2. Diameter D2 is larger than diameter D1. The pressure acting on piston 238 at the piston sealing interface 272 biases piston 238 in axial direction AD2 while the pressure acting on piston 238 at the fitting sealing interface 270 biases piston 238 in axial direction AD1. The larger diameter D2 at the piston sealing interface 272 means that a greater force is acting on piston 238 at the piston sealing interface 272 than at the fitting sealing interface 270. As such, the fluid pressure biases piston 238 in the second axial direction AD2, which is also the upstream direction in this example.

Quick connect coupler 220 is configured to receive pressurized fluid from fitting 234 such that fitting 234 is a fluid output. The fluid flows in axial direction AD1 such that axial direction AD2 is the upstream direction and axial direction AD1 is the downstream direction. The pressurized fluid enters into quick connect coupler 220 through fitting end 242. The pressurized fluid flows through piston passage 256 and is output to fluid pathway 280 within the spray gun 221. The fluid pressure acts on piston 238 to bias piston 238 into scaling engagement with fitting 234. As the fluid pressure increases, the pressure differential acting at piston sealing interface 272 and fitting sealing interface 270 increases to increase the force biasing the piston 238 into the fitting 234, further enhancing the seal between piston 238 and fitting 234.

While quick connect coupler 220 is shown as integrated into spray gun 221 such that quick connect coupler 220 receives fluid from the hose assembly 216, it is understood that not all examples are so limited. For example, quick connect coupler 220 can be integrated into the housing of a pump, such as a piston pump, diaphragm pump, peristaltic pump, plunger pump, gear pump, etc. In one example, the quick connect coupler 220 can be integrated at the outlet of the pump such that the hose assembly 216 receives pressurized fluid from the pump through quick connect coupler 220. In such an example, the pressurized fluid flows in second axial direction AD2 to be output from quick connect coupler 220 and into the hose assembly 216.

Quick connect coupler 220 and spray gun 221 are assembled together such that spray gun 221 includes an integrated quick connect coupler 220. Quick connect coupler 220 facilitates faster coupling and decoupling of flexible hoses 218 with less effort. Such a configuration lowers the burden to assemble and disassemble hose assembly 216 from a spray gun 221, or a pump, and also increases the likelihood that a user will properly service, clean, and use hose assembly 216. Quick connect coupler 220 does not require tools to couple and decouple fitting 234. Such a configuration facilitates quicker and easier assembly and disassembly as the user is not required to find and use a tool. Quick connect coupler 220 provides a smaller footprint as compared to other types of quick connectors, which is particularly advantageous when integrated into a spray gun 221, which is held and manipulated by a user. Bulkier connectors provide less room for the user to hold the spray gun 221 while heavier quick connectors can fatigue the user. As such, quick connect coupler 220 provides for more ergonomic operation with hose assembly 216. Quick connect coupler 220 being integrated into spray gun 221 allows users to continue operating with standard hoses such that a user is not required to change hose configuration to operate a spray gun 221 with quick connect coupler 220. Such a configuration can provide decreased costs and can ease use for the user.

Figure 6:
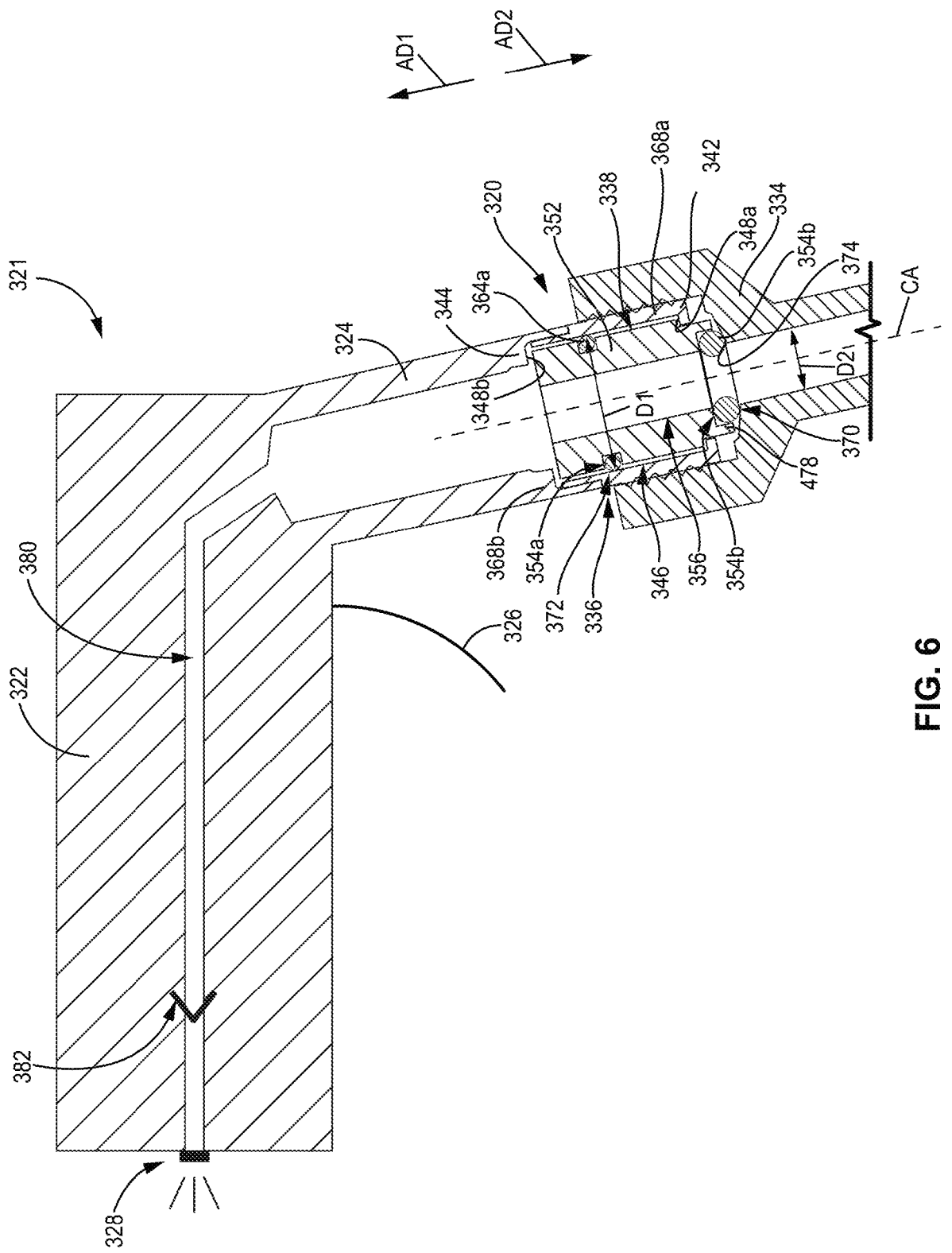
FIG. 6 is a simplified cross-sectional view of a spray gun including a quick connect coupler.

FIG. 6 is a cross-sectional view of a spray gun 321 including an integrated quick connect coupler 320. Gun body 322, fluid pathway 380, valve 382, handle 324, trigger 326, and quick connect coupler 320 of spray gun 321 are shown. Quick connect coupler 320 is substantially similar to quick connect coupler 120 (best seen in FIG. 4). Components of quick connect coupler 320 similar to components of quick connect coupler 120 are indicated with the same reference number except increased by "200." (e.g., coupler body 136 and coupler body 336). Components of spray gun 321 similar to components of spray gun 21 are indicated with the same reference number except increased by "300." Components of spray gun 321 similar to components of spray gun 221 are indicated with the same reference number except increased by "100." Quick connect coupler 320 includes coupler body 336 and piston 338. Coupler body 336 includes fitting end 342, system end 344, piston chamber 346, piston shoulder 348a and piston shoulder 348b. Piston 338 includes piston body 352, seal groove 354a, seal groove 354b, and piston passage 356. Piston seal 364a and piston seal 364b are also shown.

Spray gun 321 is configured to emit a spray of a spray fluid onto a substrate. Spray gun 321 is fluidly connected to a hose assembly 316 to receive fluid from the hose assembly 316. As discussed above, the fluid can be a liquid configured to be emitted as the spray fluid for application on the substrate or can be a compressed gas, such as compressed gas meant to assist in atomization and/or expulsion of the spray fluid from the spray gun 321. While spray gun 321 is shown as connected to a single hose assembly 316, it is understood that spray gun 321 can be connected to multiple hose assemblies 316 to receive pressurized fluids from the multiple hose assemblies 316. For example, spray gun 321 can be connected to a first hose assembly 316 to receive pressurized gas and spray gun 321 can be connected to a second hose assembly 316 to receive pressurized spray material, similar to spray gun 21.

Handle 324 extends from gun body 322. Handle 324 can be grasped by a single hand of a user to aim spray gun 321 and during actuation of spraying by spray gun 321. Trigger 326 is supported by gun body 322 and is configured to actuate valve 382 open to allow emission of spray fluid. Valve 382 is supported by gun body 322 and is configured to be actuated to an open state by trigger 326. With valve 382 in the open state, the pressurized fluid can flow downstream to nozzle 328 for emission of the spray fluid. Nozzle 328 can be shaped to shape a pattern of the emitted spray, such as into a fan or cone among other options. Valve 382 shifting to a closed state shuts off flow of the spray fluid to the nozzle 328. The valve 382 can be shifted to and held in a closed state by a spring, among other options.

Hose assembly 316 connects to spray gun 321 and is at least partially mechanically supported by spray gun 321. Fitting 334 is connected to flexible hose 318 to form hose assembly 316. Hose assembly 316 is fluidly connected to spray gun 321 to provide the pressurized fluid to spray gun 321. Quick connect coupler 320 mechanically and fluidly connects hose assembly 316 to spray gun 321.

Quick connect coupler 320 is part of spray gun 321 in the example shown. Quick connect coupler 320 is integrated into spray gun 321 such that quick connect coupler 320 remains with spray gun 321 with hose assembly 316 disconnected from spray gun 321. While quick connect coupler 320 is shown as disposed at least partially within handle 324, it is understood that quick connect coupler 320 can be integrated with spray gun 321 at any desired location at which spray gun 321 is configured to receive fluid under pressure. For example, quick connect coupler 320 can be integrated into handle 324 to receive compressed gas or compressed spray liquid, quick connect coupler 320 can be integrated into gun body 322, such as at material intake 30, quick connect coupler 320 can be integrated into a valve housing removable mounted to the gun body 322 and that includes the valve 382, among other options. In the example shown, quick connect coupler 320 is disposed at least partially outside of handle 324 such that coupler body 336 can be received by fitting 334.

In the example shown, quick connect coupler 320 is formed as a threaded connector configured to be received by the threaded fitting 334 of hose assembly 316. Coupler body 336 houses other components of quick connect coupler 320. Coupler body 336 defines piston chamber 346 within an interior of coupler body 336. The piston chamber 346 can be at least partially defined by handle 324 or by a flow directing component (e.g., tube among other options) disposed within handle 324. Coupler body 336 can be at least partially disposed within handle 324. Coupler body 336 can be monolithic or formed from more than two component parts. In some examples, body portion 368b can be formed by tubing in the handle 324 or a flowpath formed by the handle 324. In some examples, body portion 368a can be connected within handle 324 to retain piston 338 within handle 324 and handle 324 can include the exterior threading that interfaces with fitting 334. In such an example, the receiver of handle 324 within which quick connect coupler 320 is at least partially disposed can include interior threading to connect to body portion 368a and exterior threading to connect to fitting 334.

Fitting end 342 of coupler body 336 is configured to interface with fitting 334 to connect quick connect coupler 320 to fitting 334. For example, fitting end 342 can include threads configured to interface with corresponding threads on fitting 334 to form a threaded interface therebetween. In the example shown, fitting end 342 includes exterior threading configured to interface with interior threading on fitting 334. Fitting end 342 can be formed by body portion 368a, can be formed by material of handle 324, or can be formed by additional or alternative components.

Piston 338 is disposed within coupler body 336. Piston 338 is at least partially disposed within handle 324. Piston 338 can be disposed fully within handle 324 in some examples and piston 338 can be disposed fully outside of handle 324 in some examples. Piston 338 is configured to be biased into engagement with the fitting 334 mounted to quick connect coupler 320 to seal the connection between quick connect coupler 320 and the fitting 334. Piston passage 356 extends fully axially through piston 338 such that a flowpath is formed through piston 338. The fluid flows through piston 338 as the fluid flows through the quick connect coupler 320.

Piston 338 supports piston seal 364a and piston seal 364b. Seal groove 354a is formed on a radial exterior of piston 338. Seal groove 354a extends fully annularly about piston 338. Piston seal 364a is disposed within seal groove 354a. Piston seal 364a seals between the exterior of piston 338 and the interior of coupler body 336. Seal groove 354a retains piston seal 364a in both axial directions AD1, AD2. Seal groove 354b is formed on an end of piston 338. Seal groove 354b extends radially outward from piston 338. Piston seal 364b is disposed in seal groove 354b. In the example shown, piston seal 364b extends out of seal groove 354b and axially beyond piston 338. Piston seal 364b projects beyond piston 338 such that piston seal 364b can interface with and seal against seal face 374 of the fitting 334. In the example shown, piston 338 is configured such that piston seal 364b can project axially beyond coupler body 336 in second axial direction AD2.

Piston shoulder 348a is disposed at a first end of piston chamber 346 and piston shoulder 348b is disposed at a second end of piston chamber 346. Piston shoulders 348a, 348b retain piston 338 within piston chamber 346. Piston shoulder 348a extends to axially overlap with piston body 352 of piston 338. Piston shoulder 348b extends to axially overlap with piston body 352 of piston 338. Piston shoulders 348a, 348b axially overlapping with piston body 352 limit displacement of piston 338 along coupler axis CA.

In the example shown, piston 338 is configured such that piston seal 364b can extend axially out of coupler body 336 to interface with seal face 374 of fitting 334. Piston 338 includes extension 478 that is configured to position piston seal 364b axially beyond fitting end 342 to interface with seal face 374. Extension 478 can, in some examples, extend out of coupler body 336 beyond fitting end 342.

During operation, quick connect coupler 320 facilitates quick and easy connection of hose assembly 316 to spray gun 321. Fitting 334 is connected to the flexible hose 318 to form the hose assembly 316. Fitting 334 is threaded onto quick connect coupler 320 at a finger tight interface. Threading fitting 334 onto quick connect coupler 320 causes seal face 374 of fitting 334 to engage with piston seal 364b. Piston 338 is movable within piston chamber 346 along coupler axis CA and relative to coupler body 336. In some examples, quick connect coupler 320 is configured such that fitting 334 biases piston 338 into piston shoulder 348b such that piston seal 364b and piston 338 resist further threading of fitting 334 onto quick connect coupler 320, thereby making fitting 334 finger tight on quick connect coupler 320.

The fitting sealing interface 370 has diameter D1 while the piston sealing interface 372 has diameter D2. Diameter D2 is larger than diameter D1. The pressure acting on piston 338 at the piston sealing interface 372 biases piston 338 in axial direction AD2 while the pressure acting on piston 338 at the fitting sealing interface 370 biases piston 338 in axial direction AD1. The larger diameter D2 at the piston sealing interface 372 means that a greater force is acting on piston 338 at the piston sealing interface 372 than at the fitting sealing interface 370. As such, the fluid pressure biases piston 338 in the second axial direction AD2, which is also the upstream direction in this example.

Quick connect coupler 320 is configured to receive pressurized fluid from fitting 334 such that fitting 334 is a fluid output. The fluid flows in axial direction AD1 such that axial direction AD2 is the upstream direction and axial direction AD1 is the downstream direction. The pressurized fluid enters into quick connect coupler 320 through fitting end 342. The pressurized fluid flows through piston passage 356 and is output to fluid pathway 380 within the spray gun 321. The fluid pressure acts on piston 338 to bias piston 338 into sealing engagement with fitting 334. As the fluid pressure increases, the pressure differential acting at piston sealing interface 372 and fitting sealing interface 370 increases to increase the force biasing the piston 338 into the fitting 334, further enhancing the seal between piston 338 and fitting 334.

While quick connect coupler 320 is shown as integrated into spray gun 321 such that quick connect coupler 320 receives fluid from the hose assembly 316, it is understood that not all examples are so limited. For example, quick connect coupler 320 can be integrated into the housing of a pump, such as a piston pump, diaphragm pump, peristaltic pump, plunger pump, gear pump, etc. In one example, the quick connect coupler 320 can be integrated at the outlet of the pump such that the hose assembly 316 receives pressurized fluid from the pump through quick connect coupler 320. In such an example, the pressurized fluid flows in second axial direction AD2 to be output from quick connect coupler 320 and into the hose assembly 316.

Quick connect coupler 320 and spray gun 321 are assembled together such that spray gun 321 includes an integrated quick connect coupler 320. Quick connect coupler 320 facilitates faster coupling and decoupling of flexible hoses 318 with less effort. Such a configuration lowers the burden to assemble and disassemble hose assembly 316 from spray gun 321 and also increases the likelihood that a user will properly service, clean, and use hose assembly 316. Quick connect coupler 320 does not require tools to couple and decouple fitting 334. Such a configuration facilitates quicker and easier assembly and disassembly as the user is not required to find and use a tool. Quick connect coupler 320 provides a smaller footprint as compared to other types of quick connectors, which is particularly advantageous when integrated into a spray gun 321 which is held and manipulated by a user. Bulkier quick connectors provide less room for the user to hold the spray gun 321 while heavier quick connectors can fatigue the user. As such, quick connect coupler 320 provides for more ergonomic operation. Quick connect coupler 320 being integrated into spray gun 321 allows users to continue operating with standard hoses such that a user is not required to change hose configuration to operate a spray gun 321 with quick connect coupler 320. Such a configuration can provide decreased costs and can ease use for the user.

Figure 7A:
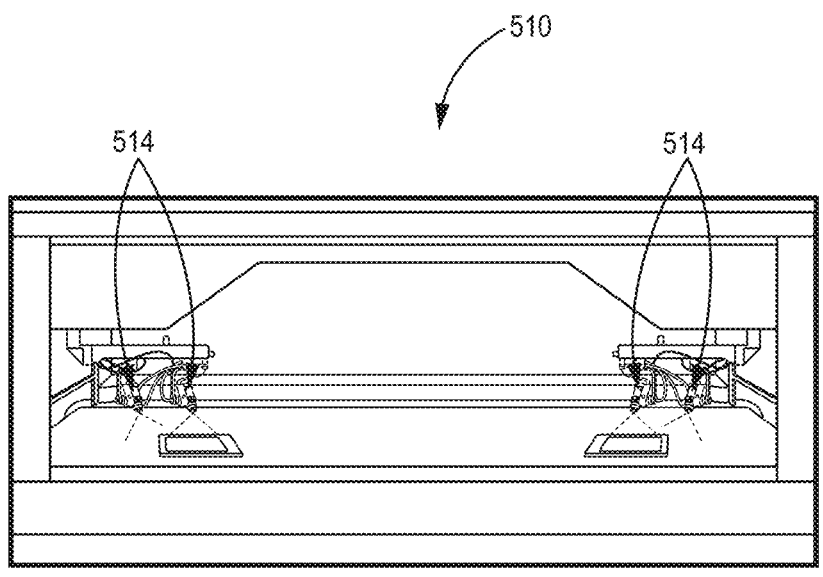
FIG. 7A is an isometric view of a spray system including automatic spray guns.
Figure 7B:
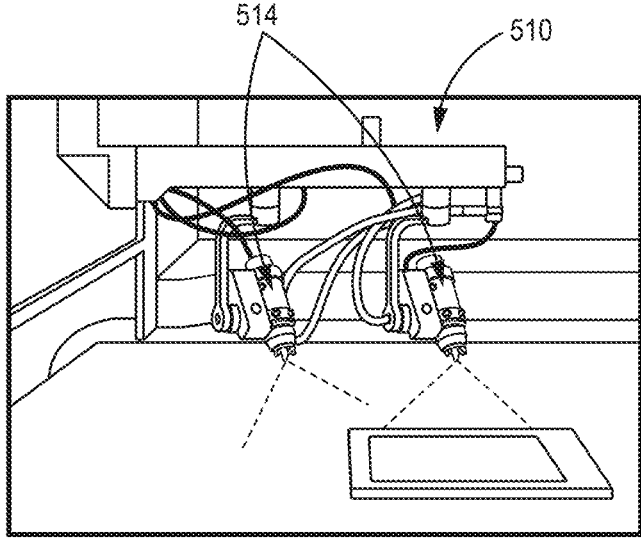
FIG. 7B is a perspective view of sprayers of the spray system shown in FIG. 7A.

FIG. 7A is an isometric view of a spray system 510 containing multiple dispensers 514. FIG. 7B is an isometric view of dispensers 514 of spray system 510. Spray system 510 is substantially similar to dispensing system 10 (best seen in FIG. 1) and can be a version of dispensing system 10. In spray system 510, dispensers 514 are configured as automatic spray guns that are manipulated and caused to spray by a machine. Components of spray system 510 similar to components of dispensing system 10 are indicated by the same reference number except increased by "500"

(e.g., dispenser 14 and dispenser 514). Spray system 510 can have multiple dispensers 514 and each dispenser 514 can have a varied spray tip orientation to maximize uniformity of coverage and minimize product waste.

Figure 8:
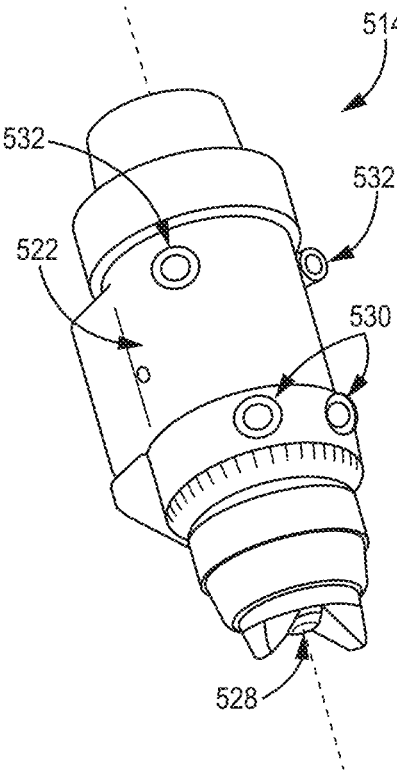
FIG. 8 is an isometric view of an automatic spray gun.

FIG. 8 is an isometric view of dispenser 514. Dispenser 514 includes gun body 522 material intakes 530 and gas intakes 532. In the example shown, dispenser 514 is an automatic spray gun in that dispenser 514 can be operated automatically by a machine rather than directly by the user. Gun body 522 is configured to receive flows of spray fluid and, in some examples, compressed gas. Gun body 522 supports other components of dispenser 514.

Dispenser 514 is configured to emit an atomized spray of the spray fluid for application to a substrate. The spray fluid is emitted through the nozzle 528 as the atomized fluid spray. Dispenser 514 can, in some examples, include one or more integrated quick connect couplers (e.g., quick connect coupler 220, quick connect coupler 320) at one or more of gas intakes 532 and material intakes 530. In some examples, dispenser 514 can connect to a hose assembly (e.g., hose assembly 16 (FIGS. 3 and 4)) having a quick connect coupler (e.g., quick connect coupler 20, quick connect coupler 120).

While the invention has been described with reference to an exemplary embodiment(s), it will be understood by those skilled in the art that various changes may be made and equivalents may be substituted for elements thereof without departing from the scope of the invention. The particular offsets and ratios illustrated and described herein are offered only by way of example, not limitation. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A hose assembly configured to convey pressurized fluid in a spray system, the hose assembly comprising:
    a flexible hose; and
    a quick connect coupler mechanically and fluidly connected to the hose, the quick connect coupler comprising:
        a coupler body having a mount end and a distal end, the mount end configured to interface with a fitting;
        a hose connector extending out of the coupler body through the distal end of the coupler body, the hose connector disposed at least partially within the flexible hose;
        a piston disposed within the coupler body, the piston having a piston body, a piston passage extending fully through the piston body along a coupler axis, a first seal groove formed on the piston body, and a second seal groove formed on the piston body;
        a first piston seal mounted in the first seal groove, the first piston seal engaging the coupler body and the piston; and
        a second piston seal mounted in the second seal groove, the second piston seal extending axially beyond the piston body and oriented towards the mount end;
    wherein the piston is movable along the coupler axis relative to the coupler body.

2. The hose assembly of claim 1, wherein the flexible hose is crimped to the quick connect coupler.

3. The hose assembly of claim 1, wherein the mount end includes interior threading.

4. The hose assembly of claim 1, wherein the mount end includes exterior threading.

5. The hose assembly of claim 4, wherein the second piston seal is at least partially disposed outside of the coupler body.

6. The hose assembly of claim 4, wherein the second piston seal projects axially beyond the mount end.

7. The hose assembly of claim 4, wherein an extension extends axially from the piston body, and wherein the extension at least partially defines the second seal groove.

8. The hose assembly of claim 7, wherein the extension projects axially out of the coupler body.

9. The hose assembly of claim 1, wherein the coupler body includes a first piston shoulder axially overlapping with the piston body to limit displacement of the piston in a first direction along the coupler axis and the coupler body includes a second piston shoulder axially overlapping with the piston body to limit displacement of the piston in a second direction along the coupler axis, the second direction opposite the first direction.

10. The hose assembly of claim 1, wherein the hose connector includes a connector body disposed in the coupler body and a barb extending out of the couple body and into the flexible hose.

11. The hose assembly of claim 10, wherein the hose connector is freely rotatable on the coupler axis.

12. The hose assembly of claim 1, wherein the hose connector includes a connector body disposed in the coupler body, a connector seal groove is formed on the connector body, and a connector seal is disposed in the connector seal groove and interfacing with the connector body and the coupler body.

13. The hose assembly of claim 1, wherein a diameter of the first piston seal is larger than a diameter of the second piston seal.

14. The hose assembly of claim 1, wherein the piston passage defines a portion of a flowpath of the pressurized fluid through the quick connect coupler.

15. A spray gun comprising:
    a gun body supporting a nozzle;
    a fluid flowpath at least partially disposed within the gun body, the fluid flowpath configured to convey a pressurized fluid to the nozzle; and
    a quick connect coupler supported by the gun body and configured to mechanically and fluidly connect a hose assembly to the spray gun, the quick connect coupler comprising:
        a coupler body having a mount end and a distal end, the mount end configured to interface with a fitting of the hose assembly;
        a piston disposed within the coupler body, the piston having a piston body, a piston passage extending fully through the piston body along a coupler axis, a first seal groove formed on the piston body, and a second seal groove formed on the piston body;
        a first piston seal mounted in the first seal groove, the first piston seal engaging the coupler body and the piston; and
        a second piston seal mounted in the second seal groove, the second piston seal extending axially beyond the piston body and oriented towards the mount end;
    wherein the piston is movable along the coupler axis relative to the coupler body.

16. The spray gun of claim 15, further comprising:
    a handle; and
    a trigger supported by the gun body, the trigger configured to control spraying through the nozzle.

17. The spray gun of any claim 16, wherein the quick connect coupler is at least partially disposed in the handle.

18. The spray gun of claim 17, wherein the quick connect coupler projects out of the handle.

19. The spray gun of claim 15, wherein the second piston seal is oriented out of the gun body.

20. The spray gun of claim 15, wherein the mount end includes one of exterior threading and interior threading.

\* \* \* \* \*